(12) United States Patent  (10) Patent No.: US 8,576,407 B2
Flechsig et al.  (45) Date of Patent: Nov. 5, 2013

(54) CONTACTLESS OPTICAL GLIDE HEAD USING AT LEAST TWO CONCURRENT INTERFERENCE SIGNALS AND A MULTI-CHANNEL LIGHT DETECTOR FOR DETECTING DISK ASPERITIES

(75) Inventors: Karl Flechsig, Los Gatos, CA (US); Gurinder Singh, San Jose, CA (US); Timothy Strand, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 551 days.

(21) Appl. No.: 12/645,205

(22) Filed: Dec. 22, 2009

(65) Prior Publication Data

US 2011/0149299 A1  Jun. 23, 2011

(51) Int. Cl.
 *G01B 11/02* (2006.01)
(52) U.S. Cl.
 USPC .......................................................... 356/507
(58) Field of Classification Search
 USPC ........................ 356/450–521, 600; 369/13.33
 See application file for complete search history.

(56) References Cited

U.S. PATENT DOCUMENTS

| 5,805,284 A * | 9/1998 | Lacey ............................ 356/507 |
| 5,818,592 A * | 10/1998 | Womack et al. ............... 356/511 |
| 6,073,486 A | 6/2000 | Packard et al. |
| 6,624,892 B1 * | 9/2003 | Johnston ....................... 356/507 |
| 7,532,329 B2 * | 5/2009 | Tai et al. ........................ 356/482 |
| 7,817,286 B2 * | 10/2010 | Kang et al. .................... 356/507 |
| 2006/0109479 A1 * | 5/2006 | Tai et al. ........................ 356/482 |
| 2006/0233061 A1 * | 10/2006 | Rausch et al. ............. 369/13.32 |

OTHER PUBLICATIONS

Eckerman, Jim "Higher Density, Higher Performance", http://polytec.com/int/_files/LM_AN_INFO_0204_E_Harddisk_Investigation.pdf, (1992),5-7.

* cited by examiner

*Primary Examiner* — Tari Fur Chowdhury
*Assistant Examiner* — Michael P Lapage

(57) ABSTRACT

A device for detecting disk asperities. The device includes an optical glide head. The glide head is not required to physically contact a disk for detection of the disk asperities. The optical glide head includes a waveguide configured to transmit light onto the disk and receive reflected light from the disk.

18 Claims, 4 Drawing Sheets

400 dispose an optical glide head over a disk, wherein the optical glide head is not required to contact the disk
410 transmit light from a waveguide onto the disk
420 receive at the waveguide a reflection of the light transmitted onto the disk
430 detect a disk asperity based at least on the received reflection of the light transmitted onto said disk
440

CONTACTLESS OPTICAL GLIDE HEAD USING AT LEAST TWO CONCURRENT INTERFERENCE SIGNALS AND A MULTI-CHANNEL LIGHT DETECTOR FOR DETECTING DISK ASPERITIES

BACKGROUND

As recording densities in hard disk drives (HDD) increase, fly height of a read/write head must decrease to properly read/write data on the disk. Accordingly, the disk surface must be very smooth and free of asperities that may deleteriously affect the HDD. Therefore, there must be sensors that can detect the disk asperities.

Typically, asperities are detected when a glide head physically contacts the asperities. As the asperities hit the glide head, the glide head vibrates in a characteristic mode (e.g., first bending, second bending, torsion, etc.). The vibrations are detected by a PZT sensor on the glide head, which in turn, produces an electrical signal. However, due to decreasing size of asperities, the amplitude of vibration is becoming too small to be detected by a PZT sensor and/or may not even be detected.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
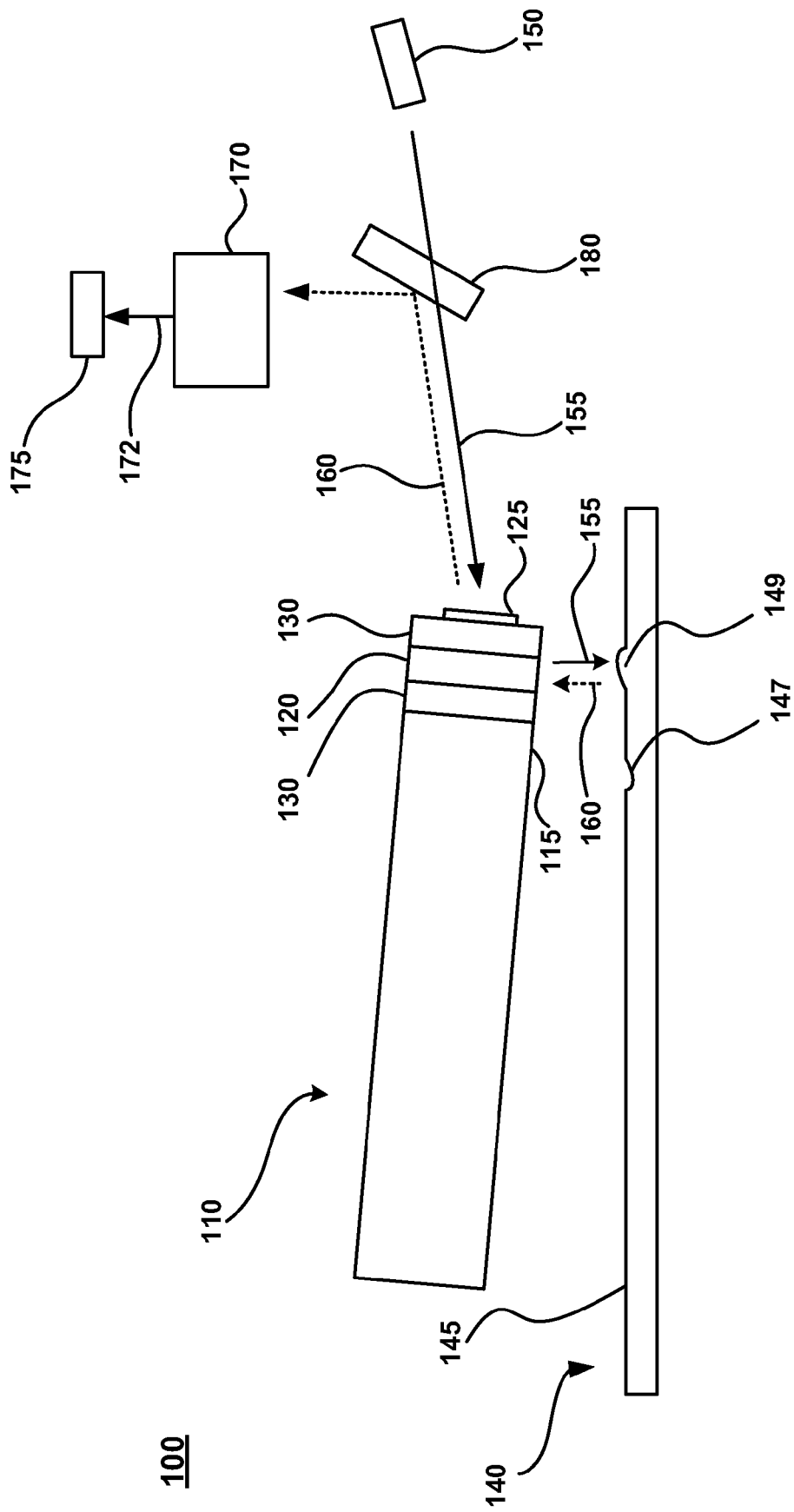
FIG. 1 illustrates an example of a disk asperity detection system, in accordance with an embodiment of the present invention.

FIG. 1 depicts a system 100 for detecting disk asperities, in accordance to an embodiment. System 100 includes an optical glide head 110, disk 140, light source 150, detector 170 and beam splitter 180. Detecting disk asperities refers to detecting any combination of height, depth and/or location of disk asperities.

Optical glide head 110 is configured to facilitate in detecting disk asperities, such as, but not limited to disk asperities 147 and 149. Disk asperity 147 is "pit" in relation to disk surface 145 and disk asperity 149 is a "bump" in relation to disk surface 145. In one embodiment, optical glide head is sensitive to disk asperities with a height or depth in the range of nanometers (nm) (e.g., less than 3 nm). It should be appreciated that the sensitivity is not limited to a range of nanometers.

Disk asperities detected by system 100 can be any physical feature comprising any material on disk surface 145 that can deleteriously affect the performance of an HDD (e.g., latent defects or pre-sputter contamination). In one embodiment, latent defects can be recognized before they have dangerous height, but do have some optical disturbance, height, or depression. For example, a delamination can initially have low fly-height on the disk. However, the outline of the delamination can be detected by system 100. Eventually the delamination will "pop up" higher due to mechanical or thermal stress.

Optical glide head 110 includes waveguide 120 configured to transmit light 155 onto rotating disk 140. It should be appreciated that disk 140 is rotated (from left to right) by a spin stand (not shown). Light 155 (generated by light source 150) is received by waveguide 120 and transmitted onto disk 140. In one embodiment, light 155 is coupled into waveguide 120 via grating coupler 125. In various embodiments, grating coupler is directly adjacent waveguide 120 (e.g., buried in cladding 130). In another embodiment, light 155 is coupled into waveguide 120 by light 155 directly impinging onto waveguide 120. In a further embodiment, light 155 is transmitted through beam splitter 180. In one embodiment, light source 150 is a laser.

Light 155 is reflected off of disk 140 and reflected light 160 is received at waveguide 120. Waveguide 120 extends to air bearing surface (ABS) 115 such that light 155 can be transmitted onto disk 140 and reflected light 160 is received at waveguide 120, as described above. In one embodiment, waveguide 120 is disposed on a distal end of optical glide head 110. It should be appreciated that waveguide 120 includes a high refractive index and is surrounded by cladding 130 with a lower refractive index to facilitate in transmitting light through the waveguide. In one embodiment, the thickness (the distance between cladding 130 in the depicted view) of waveguide 120 is 0.5 micrometers (μm). In another embodiment, the width of the waveguide (the distance from one side of the waveguide to an opposite side, in a direction going into the page) is 100 μm.

Detector 170 is configured to receive reflected light 160 from waveguide 120 and detect disk asperities, which will be described in detail later. In one embodiment, reflected light 160 is transmitted onto beam splitter 180 and is received by detector 170. In various embodiments, detector 170 can be, but is not limited to, a single photodiode, a photodiode array, a charge-coupled device (CCD) array, and the like. In one embodiment, detector 170 is a plurality of detectors configured to receive reflected light from an associated plurality of waveguides.

It should be appreciated that optical glide head 110 is not required to contact disk 140 (or disk asperities) to detect disk asperities. Accordingly, optical glide head 110 does not incur any physical wear because it does not physically interact with disk 140. Moreover, the sensitivity of optical glide head 110 to detect asperities is not strongly affected by the fly height of the optical glide head. In one embodiment, there is a fly height in a range of 30 nm to 50 nm between optical glide head 110 and disk 140.

Figure 2:
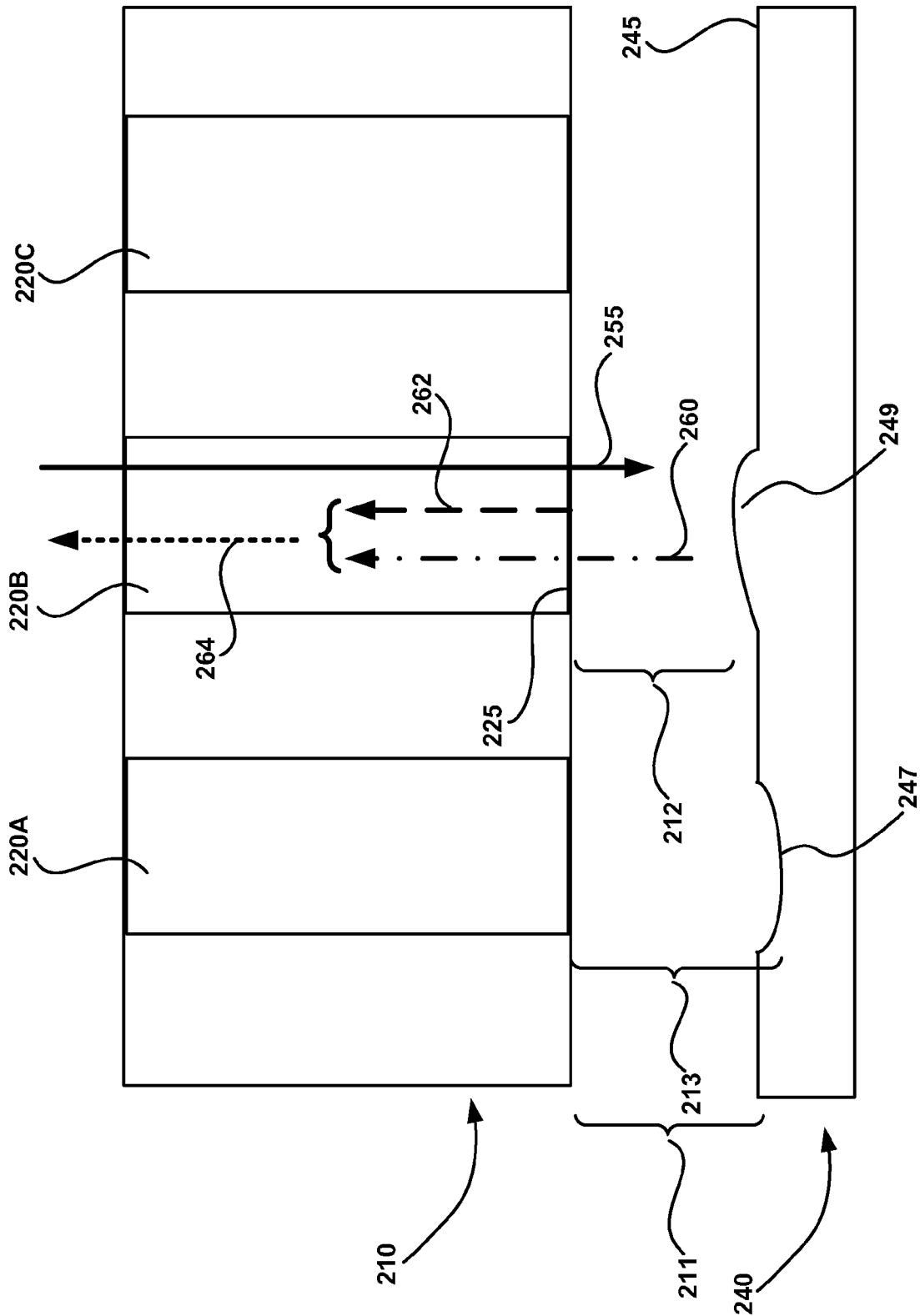
FIG. 2 illustrates an example of an optical waveguide, in accordance with an embodiment of the present invention.

FIG. 2 depicts optical glide head 210 disposed over disk 240, in accordance to an embodiment. Optical glide head 210 includes three waveguides 220A-C. However, it should be appreciated that optical glide head 210 can include any number of waveguides in any location and/or orientation that are compatible with directing light onto a disk and receiving reflected light from the disk Waveguides 220A-C receive light from a light source (e.g., 150) to facilitate in detecting disk asperities (e.g., 247 and/or 249), however, for clarity and brevity, only waveguide 230B is depicted to receive light 255 from a light source. Light 255 is coupled (e.g., via a grating coupler) into waveguide 220B. At waveguide interface 225, light 255 is transmitted out of waveguide 220B onto disk 240 while part of light 255 is reflected at the waveguide interface 225 back within the waveguide as reflection 262. As light 255 hits disk 240, a reflection 260 is reflected back towards and into waveguide 220B.

Within waveguide 220B, reflections 260 and 262 interfere with each other. The phase difference between the two reflections depends on the separation or fly height (e.g., 211) between optical glide head 210 and disk 240 and on the phase change on reflection from surfaces 225 and 245. For example, ignoring the phase change on reflection, if fly height 211 is 0.25 wavelength, then reflections 260 and 262 interfere destructively. The combination of reflections 260 and 262 (e.g., destructive interference signal) is depicted as reflection 264.

As disk 240 travels under waveguide 220B, reflection 264 is generated. If light 255 impinges on flat surface 245, then reflection 264 includes an interference signal dependent on fly height 211. Reflection 264 is transmitted to a detector (e.g., 170) to determine if an asperity is passing under waveguide 220B. In this case, an asperity is not detected because the interference signal of reflection 264 corresponds to fly height 211 which is the separation between the optical glide head 210 and surface 245.

As asperity 249 travels under waveguide 220B, reflection 264 is generated, where reflection 264 includes an interference signal dependent on fly height 212. Reflection 264 is transmitted to a detector to determine if an asperity is passing under waveguide 220B. In this case, asperity 249 is detected because the interference signal of reflection 264 corresponds to fly height 212, which is different than an interference signal based on fly height 211 (which corresponds to flat surface 245).

Likewise, as asperity 247 travels under waveguide 220B, reflection 264 is generated, where reflection 265 includes an interference signal dependent on fly height 213. Reflection 264 is transmitted to a detector to determine if an asperity is passing under waveguide 220B. In this case, asperity 247 is detected because the interference signal of reflection 264 corresponds to fly height 213, which is different than an interference signal based on fly height 211. In one embodiment, a change in height fly height of 1 nm (e.g., due to an asperity) changes the interference signal by 1%. It should be appreciated that an asperity height or depth can be derived from a measured fly height (e.g., 211-213), which is based on the received interference signals.

In various embodiments, it should be appreciated that multiple asperities can be detected when travelling under multiple waveguides (e.g., 220A-C). For example, three different asperities travelling under three different waveguides can generate three different interference signals. In one embodiment, the three different interference signals generated from the three different asperities can be transmitted to three different detectors that are associated with each waveguide. In another embodiment, the three different interference signals can be transmitted via three different channels to a single multi-channel detector (e.g., linear ray detector). It should be appreciated than any number of interference signals can be transmitted in an associated any number of channels to a multi-channel detector.

Figure 3:
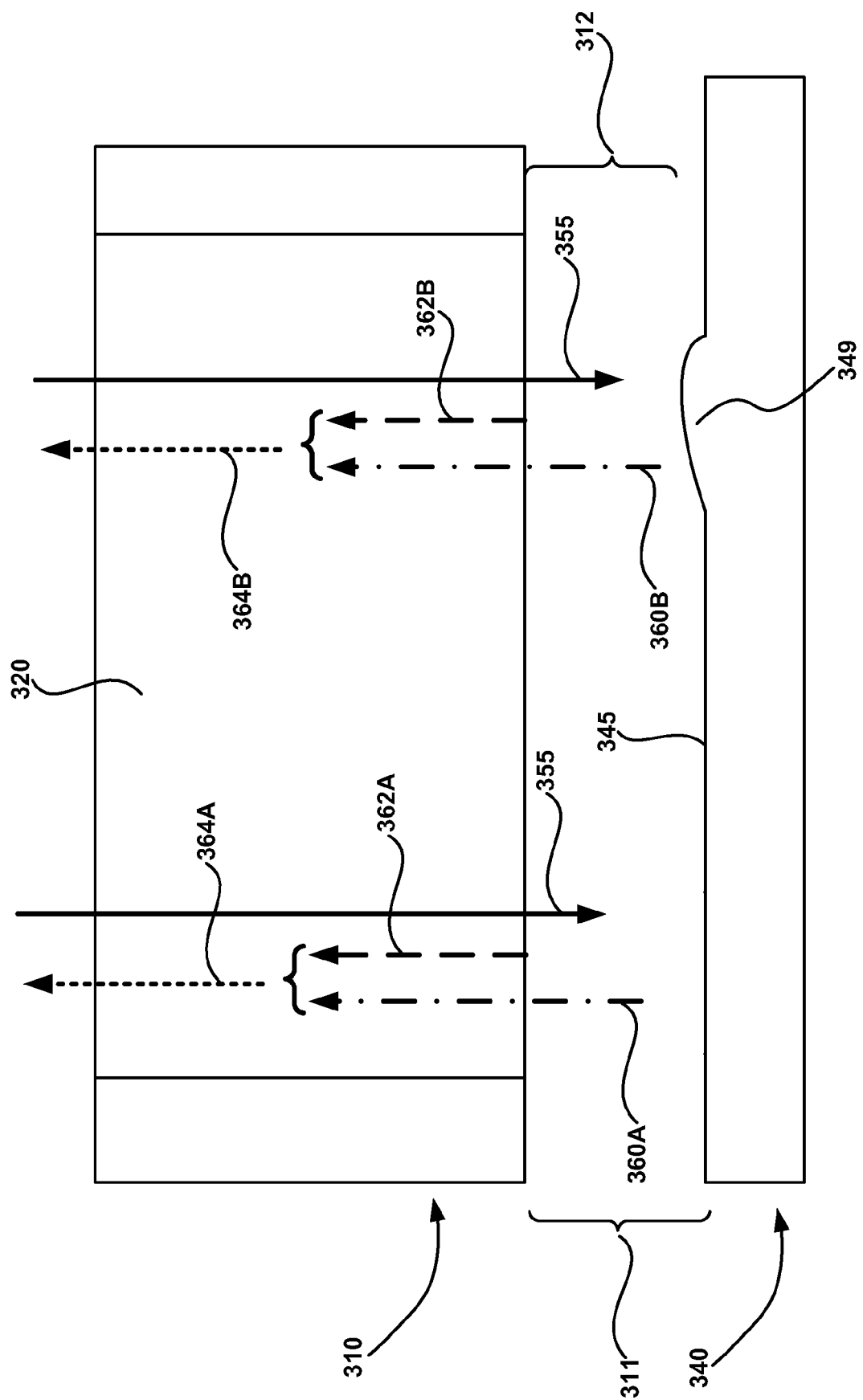
FIG. 3 illustrates an example of an optical waveguide, in accordance with an embodiment of the present invention.

FIG. 3 depicts optical glide head 310 disposed over disk 340, in accordance to an embodiment. Optical glide head 310 includes waveguide 320. It should be appreciated that waveguide 320 covers a large portion of a slider width. It should also be appreciated that disk 340 rotates either into or out of the page.

Light 355 is received by waveguide 320 and transmitted onto disk 340. Reflections 360A-B are received by waveguide 320 and interfere with reflections 362A-B, respectively, as described above. Accordingly, reflection 364B associated with fly height 312 and asperity 349 and reflection 364A associated with fly height 311 and flat surface 345 are generated. In one embodiment, reflection 364A is transmitted through a channel to a multi-channel detector and reflection 364B is transmitted through another channel to the multi-channel detector.

In another embodiment, a distance between channels that receive interference signals (e.g., 364A-B) is 4 μm. In other words, an interference signal derived from a fly height can be measured every 4 μm on surface 345 of disk 340.

FIG. 3 depicts two interference reflections 364A-B. However, it should be appreciated than any number of interference signals can be generated and transmitted to a multi-channel detector.

In another embodiment, the roll of optical glide head 310 can be measured. For example, if a fly height associated with reflection 364A is equal to a fly height associated with reflection 364B (excluding asperities), then there is no roll of optical glide head 310. However, if a fly height associated with reflection 364A is not equal to a fly height associated with reflection 364B (excluding asperities), then there is a roll of optical glide head 310. Accordingly, a roll can be calculated from the difference in fly heights. In various embodiments, a roll of an optical waveguide can be measured based on at least two interference signals.

In reference to FIG. 1, in one embodiment, system 100 includes an output signal 172 from detector 170 that is received by filter 175. Filter 175 is configured to filter out signals that can skew the detection of asperities. In one embodiment, filter 175 filters out signals associated with gradual imperfections (e.g., non-asperities) of the disk. The gradual imperfections (e.g., an imperfect flat surface) can change the fly height between optical glide head 110 and disk 140. However, the change in fly height is not due to disk asperities. In various embodiments, filter 175 is an electronic or digital filter, that filters output signal 172 from the detector 170.

In another embodiment, filter 175 filters out signals associated with a range of frequencies. A frequency of an interference signal is based on the size of defect and the rotational speed of the spin stand. For example, a frequency of an interference signal of an asperity will be higher than a frequency signal of a gradual change in an imperfect flat surface (assuming the same rotational speed of a spin stand). Accordingly, filter 175 filters out the frequencies associated with the gradual change in an imperfect flat surface because it has a lower frequency than frequencies associated with disk asperities. It should be appreciated that frequencies of disk asperities can vary widely due to asperity size and/or rotational speed of the spin stand.

Figure 4:
FIG. 4 illustrates an example of a flow chart of a method for detecting disk asperities, in accordance with an embodiment of the present invention.
Figure 4:
Figure 4:

FIG. 4 illustrates a flow chart of a method 400 for detecting disk asperities, in accordance with an embodiment of the present invention. In one embodiment, method 400 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, method 400 is performed at least by a system of FIGS. 1-3.

At 410, an optical glide head is disposed over a disk, wherein the optical glide head is not required to contact the disk. At 420, light is transmitted from a waveguide onto the disk. In one embodiment, the light is imaged onto the waveguide. In another embodiment, the light is transmitted from a plurality of waveguides onto the disk.

At 430, waveguide receives a reflection of the light transmitted onto the disk. At 440, a disk asperity is detected based at least on the received reflection of the light transmitted onto said disk.

In one embodiment, an interference signal is transmitted from the waveguide. The interference signal includes reflected light from the disk and a second reflected light from a waveguide interface. In another embodiment, light is transmitted from the waveguide to a detector. In a further embodiment, light is transmitted in a plurality of channels to a multi-channel detector.

Various embodiments of the present invention are thus described. While the present invention has been described in particular embodiments, it should be appreciated that the present invention should not be construed as limited by such embodiments, but rather construed according to the following claims.

The invention claimed is:

1. A device for detecting disk asperities, comprising:
   an optical glide head, wherein said glide head is not required to physically contact a disk for detection of said disk asperities, said optical glide head comprising:
      a waveguide configured to transmit light onto said disk and receive reflected light from said disk, wherein said waveguide is further configured to receive at least two concurrent interference signals, wherein said interference signals comprise said reflected light from said disk and a second reflected light from a waveguide interface;
      a multi-channel light detector configured to detect said at least two concurrent interference signals received at said waveguide, wherein said multi-channel light detector is configured to receive said at least two concurrent interference signals through different channels; and
      a processor configured to determine if an asperity is detected on said disk.

2. The device of claim 1, wherein said waveguide comprises:
   a grating coupler.

3. The device of claim 1, wherein said asperities are selected from a group consisting of: bumps or pits.

4. The device of claim 1, comprising:
   a plurality of waveguides.

5. The device of claim 1, configured to measure a fly height of said optical glide head based at least on said light transmitted onto said disk.

6. The device of claim 1, further configured to measure a roll of said optical glide head based at least on said light transmitted onto said disk.

7. A system for detecting disk asperities, comprising:
   an optical glide head, wherein said glide head is not required to physically contact a disk for detection of said disk asperities, said optical glide head comprising:
      a waveguide configured to transmit light onto said disk and receive reflected light from said disk, wherein said waveguide is further configured to receive at least two concurrent interference signals, wherein said interference signals comprise said reflected light from said disk and a second reflected light from a waveguide interface;
      a multi-channel light detector configured to detect said at least two concurrent interference signals received at said waveguide, wherein said multi-channel light detector is configured to receive said at least two concurrent interference signals through different channels; and
      a processor configured to determine if an asperity is detected on said disk.

8. The system of claim 7, wherein said waveguide comprises:
   a plurality of waveguides.

9. The system of claim 7, wherein said light detector comprises:
   a plurality of light detectors associated with a plurality of waveguides.

10. The system of claim 7, wherein said light detector comprises:
    an array detector configured to detect an array of signals transmitted from said waveguide.

11. The system of claim 7, comprising:
    a filter configured to filter a change in spacing between said optical glide head and said disk.

12. The system of claim 11, wherein said change in spacing comprises:
    a roll of said optical glide head.

13. A method for detecting disk asperities, said method comprising:
    disposing an optical glide head over a disk, wherein said optical glide head is not required to contact said disk;
    transmitting light from a waveguide onto said disk, wherein said waveguide is further configured to receive at least two concurrent interference signals, wherein said interference signals comprise said reflected light from said disk and a second reflected light from a waveguide interface;
    receiving at said waveguide at least two received reflections of said light transmitted onto said disk;
    detecting a disk asperity based at least on said at least two received reflections of said light transmitted onto said disk, wherein said multi-channel light detector is configured to receive said at least two concurrent interference signals through different channels;
    processing said at least two concurrent interference signals received at said waveguide to determine if an asperity is detected on said disk;
    transmitting said at least two received reflections of light from said waveguide to a beam splitter; and
    reflecting said at least two received reflections of light at said beam splitter to a detector.

14. The method of claim 13, comprising:
transmitting an interference signal from said waveguide, wherein said interference signal comprises said reflected light from said disk and a second reflected light from a waveguide interface.

15. The method of claim 13, comprising:
imaging light onto said waveguide.

16. The method of claim 13, wherein transmitting light from a waveguide onto said disk comprises:
transmitting light from a plurality of waveguides onto said disk.

17. The method of claim 13, comprising:
transmitting light from said waveguide to a detector.

18. The method of claim 17, wherein said transmitting light from said waveguide to a detector comprises:
transmitting light in a plurality of channels to a multi-channel detector.

\* \* \* \* \*